United States Patent [19]

Golba, Jr.

[11] Patent Number: 4,547,541
[45] Date of Patent: Oct. 15, 1985

[54] MELT FED BLENDING PROCESS

[75] Inventor: Joseph C. Golba, Jr., Ballston Spa, N.Y.

[73] Assignee: General Electric Company, Schenectady, N.Y.

[21] Appl. No.: 528,383

[22] Filed: Sep. 1, 1983

[51] Int. Cl.$^4$ ............................................. C08K 5/51
[52] U.S. Cl. .................................. 524/151; 264/171; 264/349; 422/259; 525/53; 525/92; 525/132; 525/145; 525/197
[58] Field of Search ............... 525/92, 145, 50, 197, 525/132, 53; 524/151; 264/171, 349; 422/259

[56] References Cited

U.S. PATENT DOCUMENTS

| | | | |
|---|---|---|---|
| 3,200,440 | 8/1965 | Bryan et al. | 264/171 |
| 3,342,901 | 9/1967 | Kosinsky et al. | 422/159 |
| 3,361,851 | 1/1968 | Gowan | 525/68 |
| 4,166,055 | 8/1979 | Lee, Jr. | 525/92 |
| 4,196,116 | 4/1980 | Haaf et al. | 525/92 |

Primary Examiner—Jacob Ziegler
Attorney, Agent, or Firm—Richard J. Traverso; James C. Davis, Jr.; James Magee, Jr.

[57] ABSTRACT

A method is provided for producing thermoplastic polymer blends with the exposure of blend constituents to extreme blending conditions minimized by melting the thermoplastic polymers and adjusting their viscosity and elasticity values, through control of their melt temperatures, prior to blending. Where the viscosity and elasticity values are adjusted properly, the desired thermoplastic polymer blend can be produced with a minimum effort.

14 Claims, No Drawings

MELT FED BLENDING PROCESS

This invention relates to a process for producing thermoplastic polymer blends. More particularly, this invention relates to a method of blending two or more molten thermoplastic polymers where the viscosities and elasticities exhibited by the thermoplastic polymers are balanced during initial blending.

Blends of thermoplastic polymers often exhibit desirable engineering properties which are not characteristic of either of the individual thermoplastic polymers utilized to form the blend. The improved engineering properties, such as tensile strength, elasticity and impact strength, makes the thermoplastic polymer blend desirable for use in finished products obtained by extrusion, injection molding, etc. The engineering properties are often dependent on the extent of dispersion of the blend constituents and the blend morphology, i.e., the form and structure maintained by the blend constituents within the blends. Where the engineering properties are dependent on the degree of dispersion and blend morphology, typically the higher the dispersion of constituents, the more enhanced the engineering properties become.

In conventional methods for producing blends of thermoplastic polymers, all the constituents of the blend are placed in a hopper and subsequently melted and blended together in an extruder. To obtain thermoplastic polymer blends with a high degree of dispersion with conventional processes, extreme blending conditions are often necessary, requiring the use of high temperatures and severe mixing action for relatively long periods of time. The high process temperatures are utilized to provide the thermoplastic polymers with viscosity and elasticity values sufficiently low to permit the thermoplastic polymers to be blended. Relatively long periods of severe mixing action at these temperatures are necessary to obtain the desired dispersion. The use of high temperatures and severe mixing action during blending is undesirable since this often increases the degradation of one or more of the sensitive thermoplastic polymers in the blend and results in a loss of the desirable engineering properties.

When blending poly(2,6-dimethyl-1,4-phenylene oxide)s, herein referred to as polyphenylene ethers, with polyolefins by conventional processes, the dispersion of polyphenylene ethers within the polyolefins is inhibited due to the relatively large difference between their melt viscosities and elasticities during blending. Properties suffer from this as well as a significant amount of polyolefin degradation. This degradation is caused by the relatively long exposure to high temperatures and severe mixing action that is necessary to provide an acceptable dispersion within the polyphenylene ether/polyolefin blend. It is apparent, therefore, that the very process conditions, i.e., temperature and mixing, necessary to obtain proper blending are themselves the cause of diminishment of certain engineering properties, such as tensile strengths, tensile elongation, and notched Izod impact strength in the polyphenylene ether/polyolefin blend produced by conventional processes.

Where the additives are introduced into a thermoplastic blend, the dispersion of the polymers may be rendered more difficult since the presence of additives can inhibit the comixing between the thermoplastic polymers. In conventional processes, dispersion of constituents can only be enhanced or reduced by adjusting the agitation and/or the processing temperature. The agitation is adjusted by varying the screw speed, screw design or throughput rate. The increase in agitation and/or processing temperature needed to enhance the dispersion can cause a further increase in the degradation of one or more of the thermoplastic polymers within the blends.

Modifications of the conventional process that attempt to overcome the problem of thermoplastic polymer degradation during the production of thermoplastic polymer blends have provided only partial solutions. In these processes the desired blend is produced in two stages. The thermoplastic polymer and other ingredients of the blend, which are less sensitive to processing conditions, are melted and blended to form a first blend. The first blend is cooled, pelletized, melted and blended once again with the more sensitive thermoplastic polymers and constitutents of the blend, to provide the final composition. Blends of polyphenylene ethers and polyolefins produced by this two-step technique have shown improved properties over the blends produced by conventional single melt processes by reducing the exposure of the polyolefins to extreme blending conditions. However, this two stage process is disadvantageous in that a portion of the blend must be melted and processed twice. In addition, the sensitive thermoplastic polymers are still exposed to severe mixing action and high temperatures when blended with the first blend in order to obtain a high degree of dispersion. Although the resulting polyolefin degradation is less than that which results from unmodified processes, the extent of degradation is still significant.

The process comprising this invention produces thermoplastic polymer blends with engineering properties superior to blends produced by conventional processes and the two stage processes by providing high dispersion of blend constituents with reduced exposure to high temperatures and severe agitation during processing.

SUMMARY OF THE INVENTION

This invention provides a method for forming a blend of thermoplastic polymers in which the individual thermoplastic polymers are separated into two or more compositions and separately melted. The melt temperatures of the compositions are adjusted to provide a viscosity ratio and elasticity ratio for the compositions in the range of about 1:1 to about 1:3 during initial blending. The compositions with adjusted melt temperatures are then contacted and blended to produce the desired thermoplastic polymer blend.

OBJECTS OF THE INVENTION

An object of the present invention is to provide a process for compounding thermoplastics with improved dispersion of blend constituents.

Another object of the present invention is to compound two or more thermoplastics with a minimization of exposure to extreme temperatures and agitation to obtain the desired dispersion of constituents.

Another object of the present invention is to compound additives within thermoplastic blends during their production, without inhibiting the compounding between thermoplastics.

Another object of the present invention is to control the extent of dispersion within thermoplastic blends by independently controlling the rheological response values of the thermoplastics which are compounded.

Another object of the present invention is to control the extent of dispersion within thermoplastic blends without altering the processing temperature or agitation during compounding.

Another object of the present invention is to produce blends of polyphenylene ethers and polyolefins with improved engineering properties and blend morphologies.

DETAILED DESCRIPTION OF THE INVENTION

The objects of the invention and other objects are accomplished by first melting a composition principally comprising one or more thermoplastic polymers; separately melting at least one other composition containing other thermoplastic polymers; adjusting the melt temperatures of the molten compositions to provide a viscosity and elasticity ratio for the compositions in the range of about 1:1 to about 1:3 during initial blending; and then blending the molten compositions to provide the desired degree of dispersion and blend morphology.

The thermoplastic polymers are aportioned among at least two compositions, herein identified as the primary composition, secondary composition, tertiary composition, etc. The thermoplastic polymers are preferably aportioned so that they are found only in one composition to the exclusion of the other compositions. The compositions are separately heated to temperatures sufficiently high to melt the thermoplastic polymers and provide a viscosity that allows the thermoplastic polymers to flow and be blended with other constituents. It is preferable to utilize the minimum temperature necessary to achieve these properties since excessive temperatures often cause unnecessary degradation of the thermoplastic polymers. For amorphous polymers, the minimum temperatures typically fall within the range of about 70°–80° C. above their glass transition temperature. For crystalline polymers, minimum temperatures typically fall within the range of about 30°–40° C. above their melting temperature. The maximum temperature for all thermoplastic polymers is the temperature where degradation occurs. When this procedure is followed, the compositions are typically melted at different temperatures due to the different melt characteristics of the thermoplastic polymers. Where some of the thermoplastic polymers utilized are sensitive to high temperatures, it is preferable to isolate these sensitive thermoplastics from other blend components in one composition and melt that composition at the lowest temperature possible. For example, the practice of this invention provides an improved process for melt blending a polyphenylene ether thermoplastic composition with a temperature and agitation sensitive thermoplastic, such as a polyolefin, without the loss of engineering properties as referred to above, due to polyolefin degradation, by separately melting the polyolefin at a lower temperature than the polyphenylene ether.

In addition to one or more thermoplastic polymers of the blend desired, the compositions may also contain additives which enhance the properties of the blends produced. These additives may include impact modifiers, plasticizers, UV stabilizers, modifiers, etc. It is preferable to utilize additives which are not sensitive to the temperatures at which the compositions must be maintained during blending. The additives are often aportioned so that a particular additive is found in only one composition to the exclusion of the other composition. Factors that determine which composition the additives are introduced into include: the temperature sensitivity of the additive, the quantity of additives and thermoplastic polymer in the composition, the melt temperature of the additive, the effect the additive has on the viscosity and elasticity of the composition, the function of the additive in the blend, etc.

For certain blends it may be desirable to premix the thermoplastic polymers and additives within a composition prior to blending with the other compositions. One reason this premixing may be desired is to prevent the dispersion of additives from being inhibited by the presence of the components within the other compositions. This premixing may be achieved in conventional single screw extruders or twin screw extruders. The extent to which the thermoplastic polymers and additives within a composition are premixed, if at all, is dependent on many factors; such as the function of the additive in the blend, the temperature sensitivity of the additives and thermoplastic polymers, the quantities of additives and thermoplastic polymers, etc.

To maintain both the viscosity ratio and elasticity ratio for the compositions in the range of 1:1 to 1:3 during initial blending, it is necessary to predetermine viscosity and elasticity values under various blending conditions since the viscosity and elasticity ratios depend on certain blending conditions. For example, the viscosity and the elasticity exhibited by the compositions are dependent on the temperature of the compositions, the deformation which the compositions are exposed to during blending, i.e., the magnitude and distribution of mechanical forces applied to the compositions during blending, and the "mode" or method in which the mechanical forces are applied to the compositions during blending.

The viscosity and asticity values required for the compositions during initial blending can be approximated by duplicating the various blending conditions in a conventional rheometer and obtaining values for the viscosity and elasticity of the compositions within these devices. The measured values can only approximate the actual viscosity and elasticity values since the rheometers cannot exactly duplicate the "mode" or method in which the forces are applied to the compositions during blending. The forces that are exhibited on a material in a rheometer are limited to either a shearing force, with planes of materials sliding with respect to each other, or an extensional force, with the material being stretched. The forces within a blending apparatus are typically a complex combination of these forces. Since only the ratios of the viscosity and elasticity of the compositions are important to this process and the viscosity and elasticity measurements obtained from conventional devices are representative of the viscous and elastic characteristics of the composition during blending, these measured values are utilized to calculate the viscosity and elasticity ratios of the compositions. The viscosity ratios and elasticity ratios calculated from the values obtained by conventional rheometers are utilized to dictate the melt temperatures of the compositions in accordance with the practice of this invention.

The temperatures of the compositions and the range of shear rates which they are exposed to during blending can be duplicated in conventional rheometers. Therefore, viscosity measurements in shear and extentional deformation modes can be accurately determined for the compositions over the expected range of temperatures and shear rates during initial blending.

However, the actual shear rates within a blending apparatus are difficult to determine since they are dependent on the complex geometry of the blending apparatus and the relative motion of parts within the apparatus. Where the shear rates are difficult to determine, approximations are suitable since the compositions are exposed to the same shear rate during blending and the ratios of their viscosity and elasticity are not effected substantially by a minor variance in the shear rate. When utilizing twin screw extruders to form the blend, the shear rates are in the range of approximately 1 to 400 1/sec according to the work of Hans Werner, thesis, *Das Betriebsverhalten Der Zweiwellingen Knetscheiben - Schneckenpresse Vom TYP ZSK Bei der Verarbeitun bon Hochviskosen Flussigneiten.* Der Techischen Universität München, Munich: West Germany, 1976. To obtain predetermined viscosity and elasticity values for the compositions, these compositions are exposed to shear rates in the range of 1 to 400 1/sec in conventional rheometers over the expected temperature range.

With the viscosity and elasticity values for the compositions predetermined for various temperatures and shear rates, the melt temperatures of the composition can be adjusted to provide viscosity and elasticity values that are in a ratio in the range of 1:1 to 1:3. It is preferable to maintain process variables, such as the shear rate, constant so as to maintain better control of the viscosity and elasticity ratios of the compositions during initial blending. The shear rates which the compositions are exposed to during initial blending are determined by the blending equipment utilized and the degree of agitation within the blending equipment. Where a twin screw extruder is utilized, there is a distribution of shear rates which are characterized by an average value. This average value can remain relatively constant if the screw speed and throughput rate are constant. The "mode" or method in which mechanical forces are applied to the compositions during blending is also determined by the equipment utilized and remains relatively constant under all blending conditions.

The temperatures of each composition during intial blending is principally determined by its melt temperature at the time it is fed into the blending apparatus. It is preferable to independently monitor and control the temperatures of the compositions just prior to being fed into the blending apparatus to maximize the control of the viscosity and elasticity ratios exhibited by the compositions during initial blending.

When attempting to maintain a viscosity ratio and elasticity ratio within the range of 1:1 to 1:3 for the compositions during intital blending, the adjustments to the melt temperatures of the compositions can be dictated by predetermined viscosity and elasticity values obtained in either a shear or extentional deformation mode. However, predetermined viscosity or elasticity values as measured in a particular mode may represent the condition of the compositions during initial blending more accurately or they may effect the dispersion process during initial blending most strongly as a function of temperature. Utilizing these predetermined values to dictate the melt temperatures of the compositions will provide greater control over the thermoplastic polymer blends produced. For example, when forming blends of polypheylene ethers and polyolefins, it is preferable to adjust the melt temperatures in accordance with viscosity values determined in a shear deformational mode since these values provide greater control over the dispersion process during blending.

Once the melt temperatures of the compositions are adjusted to maintain a viscosity ratio and elasticity ratio in the range of 1:1 to 1:3 during initial blending, the compositions are blended together to obtain the desired thermoplastic polymer blends. Since the viscosity ratio and elasticity ratio are in the range of 1:1 to 1:3, the exposure of the blend constituents to extreme blending conditions is reduced when attempting to obtain a desired dispersion and morphology in the thermoplastic polymer blend. The exposure of the blend constituents to extreme conditions is minimized due to the ease of dispersing the thermoplastics. This reduces the degradation of blend constituents which are sensitive to high temperatures and severe agitation, which often leads to an improvement in engineering properties of the blends produced.

In addition to reducing the degradation of sensitive blend constituents, maintaining the viscosity ratio and elasticity ratio within the range of 1:1 to 1:3 may provide a higher degree of dispersion than blending processes known to the art when producing particular thermoplastic polymer blends such as, for example, blends of polyphenylene ethers and polyolefins. By maintaining the melt temperatures for the polyolefins and polyphenylene ethers at values which provide a ratio of about 1:1 during initial blending, the blend produced has significantly higher tensile strength, tensile elongation and notched Izod impact strength over blends produced by conventional processes in the same blending apparatus due to the improvement in dispersion of the polyphenylene ethers within the polyolefins.

When producing a particular thermoplastic polymer blend, properties which are dependent on dispersion can be controlled by adjusting the viscosity and elasticity ratios exhibited by the two compositions during initial blending. By controlling the dispersion and morphology of the blend produced through adjustments to the viscosity and elasticity ratios of the compositions during initial blending, there is no need to vary other blending conditions, such as the processing temperature, screw speed, throughput rate, etc, when attempting to control dispersion dependent properties of the thermoplastic polymer blends produced. An added degree of control over the blends produced is thereby provided when balancing the viscosity and elasticity ratios of the compositions through adjustments in the melt temperatures since the dispersion of blend constituents can be varied without effecting the degradation of blend constituents which are sensitive to blending conditions. This is useful where additives are introduced into the blend and dilute the thermoplastic polymers, requiring the dispersion provided by the apparatus to be increased.

In the production of certain thermoplastic polymer blends, a particular viscosity ratio or elasticity ratio calculated from the predetermined viscosity and elasticity values may provide an optimum blend morphology and dispersion of blend constituents. The extent of control over the melt temperature of the compositions prior to blending permits the viscosity and elasticity values which produce this ratio to be maintained within ±1% during initial blending. However, this ratio cannot be maintained for more than a short time during blending since a loss of independent control over the melt temperatures results from the heat exchange relationship between the two compositions during blending. A loss of control over the independent temperatures of the compositions also prevents the viscosity ratio and elasticity ratio of the two compositions from being maintained within the range of 1:1 to 3:1 throughout the entire blending process. It is preferable to maintain the viscosity and elasticity ratios at the preferred value and within the range of 1:1 to 3:1 for as long as possible during blending to maximize the aid to dispersion such conditions provide.

Once the two compositions are blended, the thermoplastic polymer blend is prepared for subsequent use. Typically, this involves passing the molten thermoplastic polymer blend through a die and pelletizing said blends. These pellets may be subsequently utilized in extrusion processes, injection molding processes, etc. to obtain the finished product desired.

The production of blends of polyphenylene ethers and polyolefins by this process produces blend samples with high tensile strength, tensile elongation and notched Izod impact strength when compared to those produced by conventional processes and two stage processes. The polyolefins are typically separated from the polyphenylene ethers in either the primary or the secondary composition and melted at a lower temperature due to the sensitivity of the polyolefins to thermal degradation and the much lower viscosities and elasticities they would have at the processing temperatures required for polyphenylene ethers. Suitable melt temperatures for the composition comprised substantially of polyolefins fall within the range of about 270°–400° F., whereas suitable melt temperatures for the compositions comprised substantially of polyphenylene ethers fall within the range of about 500°–550° F. At these melt temperatures, the viscosity and elasticity values as determined in a shear deformational mode for the primary composition and the secondary composition approach a ratio of 1:1. When these molten compositions having melt temperatures within this range are introduced into a twin screw extruder operating at 300 revolutions per minute, the residence time required to produce a suitable blend is approximately one third that of conventional processes. In addition, an increase in dispersion of the blend constituents is suggested by the improved engineering properties indicated above and is seen directly from scanning electron microscopy.

Where it is desirable to utilize additives in the polyphenylene ether/polyolefin blends, they are typically placed in the composition containing the polyphenylene ethers and premixed. The polyphenylene ethers are relatively uneffected by the premixing process and the dispersion of the additives is much easier without the polyolefins present to inhibit their dispersion. Typical additives for blends of polyphenylene ethers and polyolefins include, plasticizers, such as aryl phosphate esters, and modifiers such as styrene-ethylene-butylene-styrene triblock copolymer elastomers. When preparing polyphenylene ethers/polyolefin blends, twin screw extruders are typically utilized to blend the two thermoplastic polymers. Under such circumstances, the processing temperatures typically rise to about 550°–570° F. from the heat resulting from the viscous dissipation produced by agitation.

This process is suitable for the production of any blend containing two or more thermoplastic polymers, but it becomes attractive where obtaining the desired dispersion of constituents within a blend is difficult or where degradation of one of the thermoplastics of the blend during blending is a problem. Blends suitable for production by this process typically contain thermoplastic polymers such as polycarbonates, poly(alkylene terephthalates), polyetherimides, polyphenylene ethers, etc. This process is particularly useful when utilizing thermally and/or shear sensitive thermoplastic polymers such as polyvinylchlorides, nylons, polyamides, polyolefins, etc. This process is also useful in producing blends containing high temperature and/or high viscosity polymers, such as polysulfones, polyethersulfones, polyimides, etc.

The following examples are provided in order that those skilled in the art may better understand this invention. They are provided to illustrate the invention and are not intended to limit the scope of the invention.

The examples illustrate methods of producing a thermoplastic polymer blend comprised of 30 parts by weight poly(2,6-dimethyl-1,4-phenylene oxide) thermoplastics along with 20 parts by weight of a styrene-ehtylene-butylene-styrene triblock copolymer thermoplastic elastomer used as an interfacial modifier (compatibilizer). This interfacial modifier has a total molecular weight of approximately 52,500 grams per mole (number average molecular weight) and a styrene to ethylene-butylene ratio of 29:71. The blends produced also contain 10 parts by weight of a mixture of aryl phosphate esters used as plasticizers. This aryl phosphate ester mixture contained approximately 25% triphenyl phosphate, 40% 2,3 and 4-isopropylphenyl diphenylphosphates with the remainder composed of di-, tri-, and tetra isopropyl substituted triphenyl phosphates. In addition, the blends produced contained 50 parts by weight of a low density polyethylene having a specific gravity of 0.9205, melt index of 35 and a melting temperature of 111° C.

EXAMPLE 1

This example is offered to provide an illustration of the blend obtained from a conventional process, wherein all constituents are melted and blended at the same process temperature in the same twin extruder and the viscosity ratio for the thermoplastics is about 10:1 during initial blending. In this example the polyphenylene ether, modifier and plasticizer were compounded with the polyolefin in a Werner and Pfleiderer 28 mm. twin screw extruder at a screw speed of 300 revolutions per minute. The melt temperature was maintained at approximately 568° F. The resulting product exhibited a tensile strength of 1760 psi, a tensile modulus of 13550 psi, a tensile elongation of 172% and a notched Izod impact value of 5.8 ft lb./in-n.

EXAMPLE 2

This example is offered to provide an illustration of the blend obtained from a two-stage compounding process. In this process the polyphenylene ether, modifier and plasticizer were compounded in the same twin screw extruder as described in Example 1 utilizing a melt temperature of 577° F. and screw speed of 300 revolutions per minute. The extruded product was pelletized, mixed with the polyolefin and passed through the same extruder once again. A temperature of 509° F. and a screw speed of 300 revolutions per minute were maintained providing a viscosity ratio for the thermoplastics of about 10:1. The product obtained exhibited a tensile strength of 1770 psi, a tensile modulus of 13450 psi, a tensile elongation of 208% and a notched Izod impact value of 5.3 ft lb./in-n.

EXAMPLE 3

This example demonstrates a blend produced by an embodiment of this invention. A composition comprised of the polyphenylene ether, modifier and plasticizer of the blend was compounded in the same 28 mm. twin screw extruder used in Example 1, at a speed of 300 revolutions per minute at a temperature within the range of 518 to 536° F. to form a molten primary composition. Another composition comprised of the polyolefin of the blend was melted to form a molten secondary composition in a Wayne 1 inch single screw extruder. The molten secondary composition was fed into the twin screw extruder at a point down stream of the feed hopper. The temperature of the secondary composition was maintained within the range of 329°–347° F. The two molten compositions were blended in the remaining portion of the twin screw extruder upstream from the die head and pelletized at the die head. The temperatures of the two molten compositions were maintained within the range described above so as to provide a viscosity ratio of about 1:1 as measured in a shear deformational mode, for the compositions during initial blending. The blend produced had a tensile strength of 1850 psi, a tensile modulus of 13480 psi, a tensile elongation of 254% and a notched Izod impact value of 6.0 ft lbs/in-n.

EXAMPLE 4

This example demonstrates another embodiment of the process comprising this invention. A composition comprised of the polyphenylene ether and the plasticizer of the blend was compounded in a 28 mm. twin screw extruder at a screw speed of 300 revolutions per minute to produce a primary molten composition. The melt temperature was maintained within the range of 509°–527° F. A composition comprised of the polyolefin and modifier of the blend was melted in the same single screw extruder utilized in Example 3. The molten secondary composition formed was fed into the twin screw extruder down stream of the feed hopper at the same location as that in Example 3. The temperature of the molten secondary composition was maintained within the range of 383°–401° F. The temperatures of both compositions were maintained within these ranges so as to provide a viscosity ratio of about 1:1 as measured in a shear deformational mode for the composition during initial blending compositions at contact. The two compositions were blended in the remaining portion of the twin screw extruder down stream of the point of contact. The material produced exhibited the following engineering properties: tensile strength 1720 psi, tensile modulus 12660 psi, tensile elongation 232% and notched Izod impact strength 6.4 sq. ft. lb./in-n.

Although the above examples have shown various modifications of the present invention, further modifications are possible in light of the above teachings by one skilled in the art without departing from the spirit and scope of this invention.

What is claimed is:

1. A process for producing thermoplastic polymer blends comprising:
    a. separately melting two or more compositions, each containing a major portion of one of said thermoplastic polymers to form a uniform melt thereof; and
    b. subsequently blending the resulting melts to form a uniform admixture of melts under conditions where the viscosity and elasticity values of the compositions are in a ratio within the range of about 1:1 to about 1:3 during initial blending of the admixture of the melts.

2. A process as in claim 1 wherein the viscosity values and elasticity values for the compositions are in ratios within the range of 1:1 to 1:3 during the initial blending, by adjusting the melt temperatures of said composition prior to blending.

3. A process as in claim 2 wherein the melt temperatures are adjusted to provide viscosity values for the compositions as measured in a shear deformational mode that are about equal.

4. A process as in claim 2 wherein the melt temperatures are adjusted to provide viscosity values for the compositions as measured in an extensional deformational mode that are about equal.

5. A process as in claim 2 wherein the melt temperatures are adjusted to provide elasticity values for the compositions as measured in a shear deformational mode that are about equal.

6. A process as in claim 2 wherein the melt temperatures are adjusted to provide elasticity values for the compositions as measured in an extensional deformational mode that are about equal.

7. A process as in claim 1 comprising the additional step of separately pre-blending one or more of the melted compositions prior to blending said compositions to form a uniform admixture.

8. A process for producing polyolefin/poly(2,6-dimethyl 1,4-phenylene oxide) blends which comprises:
    a. melting a primary composition comprising poly(2,6-dimethyl 1,4-phenylene oxide) to form a uniform melt thereof;
    b. melting a secondary composition comprising at least one polyolefin to form a uniform melt thereof;
    c. blending said molten primary composition and said molten secondary composition under conditions wherein the viscosity values and elasticity values of said primary and secondary composition are in a ratio in the range of about 1:1 to about 1:3 during initial blending of the molten primary and secondary compositions.

9. A process as in claim 8 wherein the viscosity values and elasticity values of said molten primary composition and said molten secondary composition are in a ratio within the range of about 1:1 to about 1:3 by independently adjusting the melt temperature of said molten primary composition and said molten secondary composition prior to blending.

10. A process as in claim 9 wherein the melt temperature of said molten primary composition and the melt temperature of said molten secondary composition are maintained at values wherein elasticity values as measured in a shear deformational mode form a ratio of about 1:1.

11. A process as in claim 10 wherein the melt temperature of said molten primary composition and the melt temperature of said molten secondary composition are maintained at values wherein viscosity values as measured in a shear deformational mode are in a ratio of about 1:1.

12. A process as in claim 8 wherein said molten primary composition comprises poly(2,6-dimethyl-1,4phenylene oxide), styrene-ethylene-butylene triblock copolymer thermoplastic elastomers, and aryl phosphate esters and said secondary composition comprises a low density polyethylene.

13. A process as in claim 8 wherein said molten primary composition comprises poly(2,6-dimethyl-1,4phenylene oxide) and aryl phosphate esters and said molten secondary composition comprises a low density polyethylene and styrene-ethylene-butylene triblock copolymer thermoplastic elastomers.

14. A process as in claim 9 wherein the melt temperature of said molten secondary composition is adjusted to a value within the range of about 270°–400° F. and the melt temperature of said molten primary composition is adjusted to a value within the range of 500°–550° F.

* * * * *